United States Patent
Pope et al.

(10) Patent No.: US 10,742,782 B2
(45) Date of Patent: Aug. 11, 2020

(54) TIME STAMPING NETWORK DEVICE

(71) Applicant: XILINX, INC., San Jose, CA (US)

(72) Inventors: Steven L. Pope, Cambridge (GB); Derek Roberts, Cambridge (GB); Neil Turton, Cambridge (GB)

(73) Assignee: XILINX, INC., San Jose, CA (US)

(*) Notice: Subject to any disclaimer, the term of this patent is extended or adjusted under 35 U.S.C. 154(b) by 0 days.

(21) Appl. No.: 15/607,221

(22) Filed: May 26, 2017

(65) Prior Publication Data

US 2018/0343183 A1    Nov. 29, 2018

(51) Int. Cl.
*H04L 29/06* (2006.01)
*H04L 12/26* (2006.01)
*H04J 3/06* (2006.01)
*G06F 13/16* (2006.01)
*G06F 11/34* (2006.01)

(52) U.S. Cl.
CPC .......... *H04L 69/28* (2013.01); *G06F 11/3476* (2013.01); *G06F 13/1689* (2013.01); *H04J 3/0667* (2013.01); *H04J 3/0697* (2013.01); *H04L 43/0852* (2013.01); *H04L 43/106* (2013.01)

(58) Field of Classification Search
CPC ... G06F 11/1604; G06F 11/1675–1695; G06F 11/3476; H04J 3/06–076; H04J 2011/0096; H04J 3/0685–0697; H04L 7/0004–10; H04L 41/14; H04L 43/04; H04L 43/10–12; H04L 69/02–14; H04L 69/18–324; H04L 69/28; H04W 56/0005–0095
See application file for complete search history.

(56) References Cited

U.S. PATENT DOCUMENTS

| | | | |
|---|---|---|---|
| 2005/0169355 A1* | 8/2005 | Amirichimeh | H03K 5/135 375/219 |
| 2006/0023820 A1* | 2/2006 | Adkisson | H04L 7/02 375/354 |
| 2007/0268938 A1 | 11/2007 | Dowd | |
| 2008/0025344 A1 | 1/2008 | Biederman et al. | |
| 2010/0085989 A1* | 4/2010 | Belhadj | H04J 3/0667 370/503 |
| 2010/0309932 A1* | 12/2010 | Diab | H04J 3/0682 370/503 |

(Continued)

FOREIGN PATENT DOCUMENTS

CN    103812592 B    7/2016

OTHER PUBLICATIONS

EP 18174286.7—Extended European Search Report, dated Nov. 20, 2018.

*Primary Examiner* — Timothy J Weidner
(74) *Attorney, Agent, or Firm* — Haynes Beffel & Wolfeld, LLP; Andrew L. Dunlap; Paul A. Durdik

(57) ABSTRACT

A network interface device is provided. The network interface device comprises an input configured to receive a data frame from a network. The network interface device also comprises a timing component configured to store, for the data frame, first timing information and compensation information. The compensation information is specific to the frame. The first timing information and said compensation information representing a time when the data frame was received.

25 Claims, 10 Drawing Sheets

(56) References Cited

U.S. PATENT DOCUMENTS

| | | | |
|---|---|---|---|
| 2012/0155497 A1* | 6/2012 | Lee | H04J 3/0697 |
| | | | 370/507 |
| 2015/0381338 A1 | 12/2015 | Basso et al. | |
| 2016/0294536 A1* | 10/2016 | Biederman | H04L 5/0044 |
| | | | 370/350 |
| 2018/0107579 A1 | 4/2018 | Chapman | |

* cited by examiner

Figure 1 – Prior Art

TIME STAMPING NETWORK DEVICE

FIELD

Some embodiments relate to a network interface device which is arranged to time stamp packets.

BACKGROUND

There are many applications which require high levels of precision and determinism from a network such as real time control systems, cellular networks, and telecommunications systems.

Typically, existing network standards such as SDH/SONET and Synchronous Ethernet (SyncE) are used for these applications. Using carefully designed hardware existing synchronous networks aim to keep the end to end jitter and delay to a minimum.

Synchronous networks may operate with a single clock, this clock typically being embedded within the physical layer protocol. However, implementation of such a system may be relatively expensive. Synchronous networking equipment may be very expensive.

Commercial data centres may use packet based statistically multiplexed networks (STDM) such as Ethernet. STDM may offer scalability due to its volume price benefit and a relatively simple deployment model. However, the time precision and determinism of STDM may not meet some requirements.

SUMMARY

According to an aspect there is provided a network interface device comprising: an input configured to receive a data frame from a network; and a timing component configured to store for said data frame first timing information and compensation information, wherein said compensation information is specific to said frame, said first timing information and said compensation information representing a time when said data frame was received.

A physical layer processing component may be provided, operating at a first clock frequency and configured to receive said data frame from an interface component operating at a second clock frequency, the physical layer processing component configured to provided first compensation information The physical layer processing component and the interface component may be in a first clock domain.

The first clock domain may comprise a network clock domain.

The first compensation information may comprise a fractional clock value dependent on said first and second clock frequencies.

The fractional clock value may comprise an offset value associated with a given bit of said data frame.

The offset value may represent an offset between a clock edge of said first clock frequency and a respective clock edge of said second clock frequency.

The given bit of said data frame may comprise a first bit of a data part of said data frame.

The interface component may comprise a physical medium attachment component.

The first clock and the second clock may be such that one is derived from the other or derived from a common clock source.

There may be provided a data processing component configured to cause at least one of said first timing information and said compensation information to be stored in said timing component.

The first timing information may comprise a count value.

The timing component may comprise a PTP component.

The data processing component may comprise a medium access controller.

There may be provided a physical layer processing component, wherein said data processing component is in a different clock domain to a physical layer processing component.

There may be provided a phase detector configured to determine a difference in a phase between a respective clock edge used by said data processing component and a corresponding clock edge used in the clock domain of the physical layer processing component.

Second compensation information may further comprise information on said difference in phase.

A clock of said first clock domain and a clock of said different clock domain may be derived from different oscillators.

The data frame may comprise an Ethernet frame.

The timing component may be configured to provide said first timing information and compensation information or time stamp information derived therefrom to an application to use the information as a time that said data frame is received.

The compensation information may be with respect to a specific part of said frame.

The specific part of said frame may comprise a specific byte or bit.

An interface bit width of the physical layer processing component may be one of the same or different to that of interface component.

According to another aspect there is provided, a network interface device comprising: an output configured to transmit a data frame onto a network; and a timing component configured to store for said data frame first timing information and compensation information, wherein said compensation information is specific to said frame, said first timing information and said compensation information representing a time when said data frame was one of transmitted or scheduled to be transmitted.

There may be provided a physical layer processing component operating a first clock frequency and configured to provide said data frame to an interface component operating at a second clock frequency, said physical layer processing component configured to provided first compensation information.

The physical layer processing component and said interface component may be in a first clock domain.

The first clock domain may comprise a network clock domain.

The first compensation information may comprise a fractional clock value dependent on said first and second clock frequencies.

The fractional clock value may comprise an offset value associated with a given bit of said data frame.

The offset value may represent an offset between a clock edge of said first clock frequency and a respective clock edge of said second clock frequency.

The given bit of said data frame may comprise a first bit of a data part of said data frame.

The interface component may comprise a physical medium attachment component.

The first clock and the second clock may be such that one is derived from the other or derived from a common clock source.

The network interface device may comprise a data processing component configured to cause at least one of said first timing information and said compensation information to be stored in said timing component.

The first timing information may comprise a count value.

The timing component may comprise a PTP component.

The data processing component may comprise a medium access controller.

There may be provided a physical layer processing component and a data processing component, wherein said data processing component is in a different clock domain to a physical layer processing component.

There may be provided a phase detector configured to determine a difference in a phase between a respective clock edge used by said data processing component and a corresponding clock edge used in the clock domain of the physical layer processing component.

The second compensation information may further comprise information on said difference in phase.

A clock of said first clock domain and a clock of said different clock domain may be derived from different oscillators.

The data frame may comprise an Ethernet frame.

The timing component may be configured to provide said first timing information and compensation information or time stamp information derived therefrom to an application to use the information as a time that said data frame is transmitted or scheduled to be transmitted.

The compensation information may be with respect to a specific part of said frame.

The specific part of said frame may comprise a specific byte or bit.

An interface bit width of the physical layer processing component may be one of the same or different to that of interface component.

According to another aspect, there is provided a network interface device comprising: a first clock domain, one or more clocks of said first clock domain being provided by a local oscillator; a second clock domain, one or more clocks of said second clock domain being derived from a network clock; and a phase detector configured to determine a difference in phase between a clock of said first clock domain and a clock of said second clock domain, said determined phase difference being used as timing information for one of data of a frame being received from the network and transmitted onto the network.

According to another aspect, there is provided a network interface device comprising: a physical medium attachment component configured to receive data packets from a network at a first frequency using a first number of bits; and a physical coding sublayer PCS component configured to receive data packets from said physical medium attachment part at a second frequency using a second number of bits, wherein said PCS component is configured to provide timing information using at least one of: said first and second frequencies; and said first and second numbers of bits.

According to another aspect there is provided a method comprising: receiving a data frame from a network; and storing for said data frame first timing information and compensation information, wherein said compensation information is specific to said frame, said first timing information and said compensation information representing a time when said data frame was received.

The method may comprise receiving said data at a physical layer processing component operating a first clock frequency from an interface component operating at a second clock frequency, said method comprising provided by said physical layer processing component first compensation information The physical layer processing component and said interface component may be in a first clock domain.

The first clock domain may comprise a network clock domain.

The method may comprise determining first compensation information which comprises a fractional clock value dependent on said first and second clock frequencies.

The method may comprise determining as said fractional clock value an offset value associated with a given bit of said data frame.

The offset value may represent an offset between a clock edge of said first clock frequency and a respective clock edge of said second clock frequency.

The given bit of said data frame may comprise a first bit of a data part of said data frame.

The interface component may comprise a physical medium attachment component.

The first clock and the second clock may be derived from the other or derived from a common clock source.

The method may comprise causing storing at least one of said first timing information and said compensation information by a data processing component.

The first timing information may comprise a count value.

The method may comprise storing at least one of said first timing information and said compensation information in a PTP component.

The data processing component may comprise a medium access controller.

The data processing component may be in a different clock domain to the physical layer processing component.

The method may comprise determining a difference in a phase between a respective clock edge used by said data processing component and a corresponding clock edge used in the clock domain of the physical layer processing component.

Second compensation information may further comprise information on said difference in phase.

A clock of said first clock domain and a clock of said different clock domain may be derived from different oscillators.

The data frame may comprise an Ethernet frame.

The method may comprise providing said first timing information and compensation information or time stamp information derived therefrom to an application to use the information as a time that said data frame is received.

The compensation information may be with respect to a specific part of said frame.

The specific part of said frame may comprise a specific byte or bit.

According to another aspect, there is provided a network interface device comprising: a first block having an output configured to provide a data frame to a second block using a second clock frequency, said first block using a first clock frequency, said first and second clock frequencies being different clock frequencies, said interface being configured to provide timing information for at least part of said data of said data frame.

According to another aspect, there is provided a network interface device comprising: a first block having an input configured to receive a data frame from a second block domain using second clock frequency, said first block using a first clock frequency, said first and second clock frequencies being different clock frequencies, said interface being configured to provide timing information for at least part of said data packet.

According to another aspect, there is provided a method comprising: transmitting a data frame onto a network; storing for said data frame first timing information and compensation information, wherein said compensation information is specific to said frame, said first timing information and said compensation information representing a time when said data frame was one of transmitted or scheduled to be transmitted.

The method may comprise providing by a physical layer processing component operating a first clock frequency said data frame to an interface component operating at a second clock frequency, said method comprising providing by the physical layer processing component first compensation information The physical layer processing component and said interface component may be in a first clock domain.

The first clock domain may comprise a network clock domain.

The method may comprise determining first compensation information which comprises a fractional clock value dependent on said first and second clock frequencies.

The method may comprise determining as said fractional clock value an offset value associated with a given bit of said data frame.

The offset value may represent an offset between a clock edge of said first clock frequency and a respective clock edge of said second clock frequency.

The given bit of said data frame may comprise a first bit of a data part of said data frame.

The first clock and the second clock may be such that one is derived from the other or derived from a common clock source.

The method may comprise causing storing at least one of said first timing information and said compensation information by a data processing component.

The first timing information may comprise a count value.

The timing component may comprise a PTP component.

The data processing component may comprise a medium access controller.

The data processing component may be in a different clock domain to the physical layer processing component.

The method may comprise determining a difference in a phase between a respective clock edge used by said data processing component and a corresponding clock edge used in the clock domain of the physical layer processing component Second compensation information may further comprise information on said difference in phase.

A clock of said first clock domain and a clock of said different clock domain may be derived from different oscillators.

The data frame may comprise an Ethernet frame.

The method may comprise providing said first timing information and compensation information or time stamp information derived therefrom to an application to use the information as a time that said data frame is transmitted or scheduled to be transmitted.

The compensation information may be with respect to a specific part of said frame.

The specific part of said frame may comprise a specific byte or bit. In another aspect a computer program product comprises computer executable code which when run is configured to provide any of the above methods.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

Some embodiments will now be described by way of example only with reference to the accompanying drawings, in which.

DETAILED DESCRIPTION OF EMBODIMENTS

An STDM network allows network elements to operate using its own independent clock reference, rather than a synchronous network clock. This means that each network element may be designed to adapt to the clock differences between itself and its neighbours. For many applications the addition of buffering in conjunction with a higher level of flow control is sufficient for the application. Higher level protocols such as TCP/IP have also evolved to provide retransmission should packet loss occur within the network.

Using Gigabit Ethernet as an example, there is local synchronisation between adjacent nodes. Typically a transmitter operates on its own local clock (a free running oscillator) and a receiver recovers this clock from the received data (using specific physical layer line encoding). It is therefore a common requirement that the implementation of an Ethernet endpoint will use multiple clock domains. Receive and transmit logic are driven using the respective domains. A core clock domain may be chosen to be optimal for packet processing or switching. A different clock domain, for example for the I/O bus interface logic, is often required. Signals which cross clock domain boundaries traverse logic structures which are designed to ensure that any signal asserted in one clock domain is stable for a sufficiently long time so as to be correctly registered in the other domain. These structures introduce same timing non-determinism or jitter. In general the time taken for a given signal to cross a domain is not known during operation and designs simply cope with the jitter usually through the use of buffering.

However, some STDM systems may fail to provide the high levels of precision and determinism required by some real time control systems, cellular networks, and/or telecommunication systems. Some embodiments may therefore provide a network interface device capable of performing relatively high precision time stamping of packets to deliver the relatively high levels of precession and determinism required in some applications.

Figure 1:
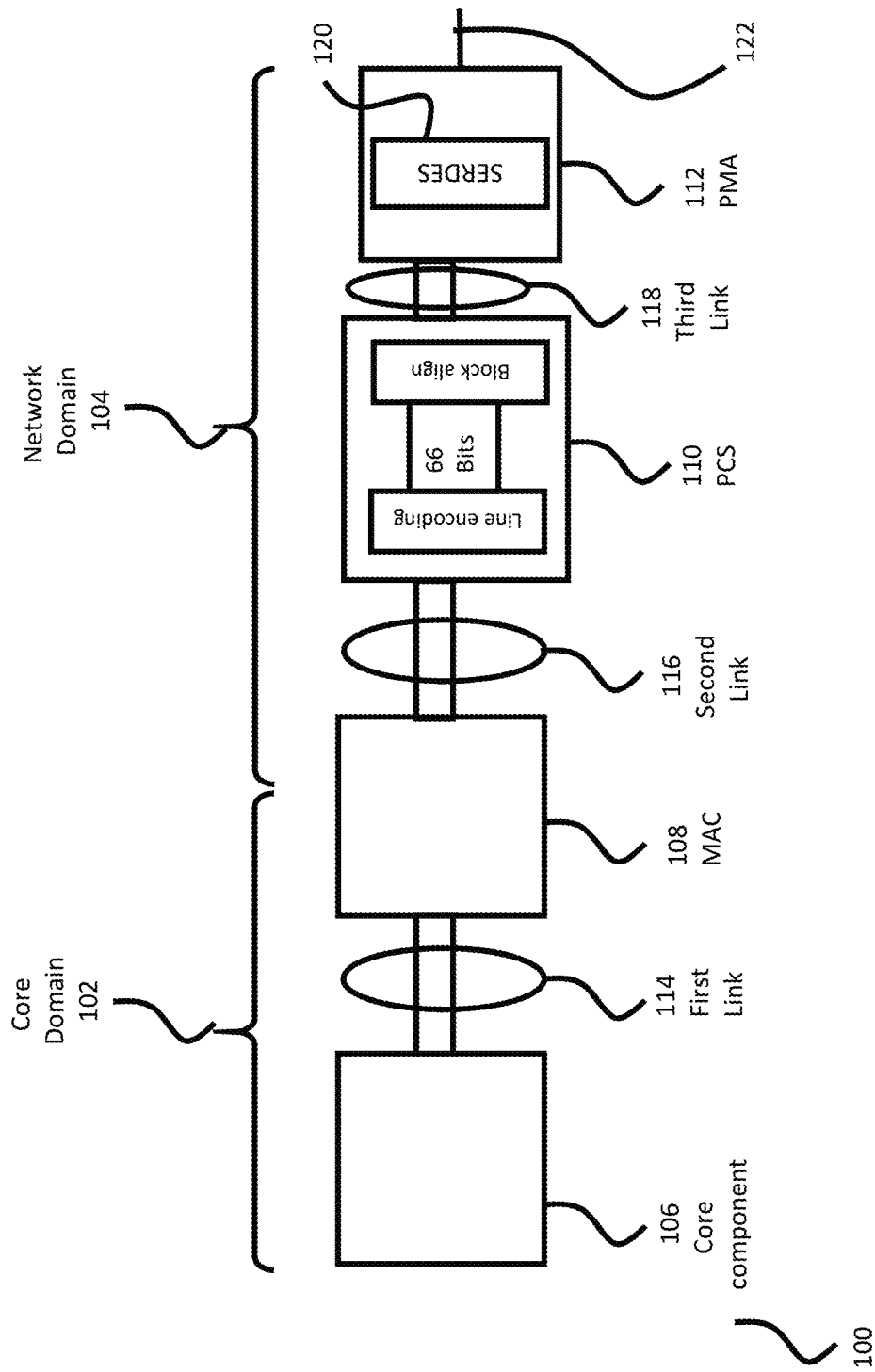
FIG. 1 illustrates schematically a typical 10 Gigabit Ethernet implementation.

FIG. 1 illustrates the clock and link widths which may be found in a typical 10 Gigabit Ethernet (10 GbE) implementation. FIG. 1 depicts a 10 Gigabit Ethernet implementation 100 viewed in both the core domain 102 and the network domain 104. The core domain 102 comprises a core component 106 and a core part of a Media Access Control (MAC) component 108, linked to the core component via a first link 114. The network domain 104 comprises a network part of the MAC component 108, a Physical coding sublayer (PCS) component 110, and a Physical Medium Attachment (PMA) component 112.

The core component 106 is typically linked to the MAC component 108 via the first link 114 operating for example at 800 MHz using 64 bits. The MAC component 108 is typically connected to the PCS component 110 via a second link 116 operating at for example either 312.5 MHz using 32 bits or 156.25 MHz using 64 bits. The PCS component 110 is typically linked to the PMA component 112 via a third link 118 operating, for example, at 322 MHz using 32 bits. That is to say the PCS component 110 may be linked to the PMA component 112 via the third link 118 operating, for example, at 322 MHz using a 32 bit word length. Operating at a frequency f of 322 MHz results in a period T of 3.1 ns using the well-known relationship T=1/f. The PMA may implement a SERDES 120. The PMA 112 may be configured to provide a point of physical attachment for receiving one or more wires 122. The one or more wires may provide a connection to a network. The connection to the network may be provided at a frequency of 10.312 GHz, or more specifically 1 bit/10.312 GHz.

Many applications require accurate timing information such as, for example, real time control systems, cellular networks, high frequency financial trading, and telecommunications systems. This may be useful, for example, in the case of cellular networking where transmissions from a base station may be based on a master clock rather than a local clock.

Timing information with increased precision may be advantageous in that it may lead to a reduction in the buffering required at the network interface device. This reduction in buffering required may be explained, for example, by the central limit theorem, which suggests that the buffer may be reduced by a factor of $\sqrt{n}$, wherein n is the number of flows passing through the device. Reducing buffering may reduce device costs and/or enhance signal quality.

For applications which require knowledge or control over the absolute time of a frame transmission or reception, the time that an Ethernet frame is transmitted onto and/or received from the network may be a useful attribute. For example, this may be the time with reference to a specific byte of an Ethernet frame.

In some embodiments, the absolute time of a frame transmission or reception may be referenced to, for example, a byte of an Ethernet frame. The absolute time of a frame transmission or reception may be determined with reference to the first byte of the Ethernet frame. In some embodiments it is desirable to measure the absolute time of transmission or reception of the start of frame delimiter with good resolution and/or precision. Determining the absolute time of transmission can be very important for network clock synchronisation algorithms (such as IEEE 1588) and other performance monitoring applications.

In some embodiments, other timings may be derived using the time that an Ethernet frame is transmitted onto and/or received from the network along with knowledge of the network clock frequency. Referencing the absolute time of a frame transmission to a byte of an Ethernet frame may enable the transmission time of a frame to be controlled very precisely. Controlling the transmission timings very precisely may be beneficial if the packet contents are to be transmitted to a recipient device with stringent timing requirements such as, for example, a frame buffer, a real-time control system, a synchronous network, or a pre-allocated time slot within wireless network. It may be understood that pre-allocated time slots may be a feature of a synchronous wireless network.

By way of example, a 10 Gb/s link may be considered as a single bit stream clocked at 10.3125 GHz. The link may use values provided by the IEEE802.3 standards. A frequency of 10.3125 GHz accounts for 2 overhead bits for every 64 bits transmitted or received. That is to say this example describes a 10 Gb/s link using 64/66 bit line encoding. This line encoding may be compatible with the IEEE802.3 standard. It may be understood however, that these numbers are by way of example only. Network devices may utilise other clock frequencies and encoding values for other network standards.

The PMA may be configured to provide a point of physical attachment to the wire. The PMA may also be configured to provide analogue-digital conversion. At the interface between the PMA and PCS, the start of frame is indicated by a 2 bit sync header and can therefore be determined theoretically to a resolution of: 3.1 ns/16~194 ps.

In some embodiments, a 10 GBASE-R block format may be used. Each block is as mentioned previously 66 bits. Each block starts with a sync header of 2 bits, for example 01 or 10. An Ethernet frame would typically have a start of frame word control word in one block and Ethernet frame data in a subsequent block. A time stamp is for a first bit of data in the subsequent block, following the sync header of that block. The interface in this example is 32 bits wide. The line encoding uses 2 bits to specify start of frame, so this can appear at any one of 32/2=16 positions in the 32 bit word transferred over the PMA/PCS interface.

However, typically, the start of frame is not usually determined until the MAC interface and precision is lost during the communication stages between the PMA and MAC. A number of issues may lead to the loss of timing information.

One issue that may lead to the loss of timing information is that the PMA, PCS, and MAC blocks may generally be acquired from different vendors and integrated within any given design. Different vendors may implement their design using different bus interface widths and speeds. For example, it is not uncommon for a 1 Gb/s Serializer/Deserializer (SERDES) to provide a 10 bit interface and a 10 Gb/s SERDES to provide a 20 bit interface. In fact providing 8, 10, 20, or 40 bit interfaces would not be uncommon, depending on the particular vendor and the implementation technology.

Another issue that may lead to the loss of timing information is that, for transmission, the start of frame is not generally known until the block alignment and the line decoding steps have taken place. These may be provided by data path functions of the PCS blocks. For example, upon receiving a data stream or a network packet from the MAC, the first step of the PCS is to construct blocks according to the line encoding. Using the 10 GbE example, described previously, the line encoding is a 66 bit quantity, and as such, the blocks constructed by the PCS will contain 66 bits. The constructed blocks are shifted into alignment with logic driven by the transmit network clock domain using a block alignment function. The transmit network clock domain may be derived from a local oscillator.

A local oscillator may be configured to provide the clock for the core domain. In some embodiments, the core clock domain and the transmit network clock domain may be derived from the same local oscillator. Deriving the core clock domain and the transmit network clock domain from the same local oscillator may provide a fixed stable phase relationship between the core clock domain and the transmit network clock domain. In some embodiments, the core clock domain and the transmit network clock domain may be derived from different local oscillators. Different local oscillators may be provided if for example if no simple relationship between the required core and network clock frequencies exists. Different local oscillators may provide a fully asynchronous domain crossing from the core clock domain to the transmit network clock domain.

The block alignment function is typically performed using a gearbox structure. That is to say, a gearbox structure may be used to, for example, convert the number of bits received every clock cycle to the number of bits used in each frame of the line encoding for each cycle. The gearbox structure used for block alignment may comprise a shift register. The shift register may be configured to receive the PCS line encoded 66 bit blocks. Each 66 bit block may be shifted onto the 32 bit PMA interface ready for transmission over the at least one wire.

Another data path function of the PCS may be to decode the line encoding during a receive operation. The decoding of the line encoding may result in a 32 or 64 bit interface to the MAC. The interface between the MAC and the PCS may operate at different frequencies depending on the number of bits utilised. For example, the interface may operate at 312.5 MHz for a 32 bit interface or at 156.25 MHz for a 64 bit interface. In the example given, the start of frame timing resolution determined at the 32 bit interface would be at a frequency of 312.5 MHz. That is to say, in the example given, the start of frame timing resolution determined at the 32 bit interface would be at 3.2 ns.

On the receive side, the PCS-gearbox may form 66 bit beats from the 32 bit PMA interface. A beat may be a consecutive series of bits. The PCS may perform line decoding to generate 64 bit blocks which are transferred to the MAC via the 32 or 64 bit interface.

Multilane Ethernet standards may add additional complexity into the network interface device. In multilane Ethernet standards, the PCS block also acts as a point of multiplexing/demultiplexing into multiple SERDES links and therefore also implements de-skewing functions. Multispeed implementation may require the SERDES to operate at 1, 10, or 25 Gb/s and be used in 1, 2 or 4 lane groups which are consolidated by the PCS into 1, 10, 25, 40, 50 or 100 Gig Ethernet links. For this reason implementations of the MAC, PCS, and PMA are often abstracted. The abstraction becomes necessary due to the quantity and complexity of the MAC/PCS/PMA mappings and the clock domain crossing between the clock of the core logic in the core domain and network clock in the network domain.

Figure 2:
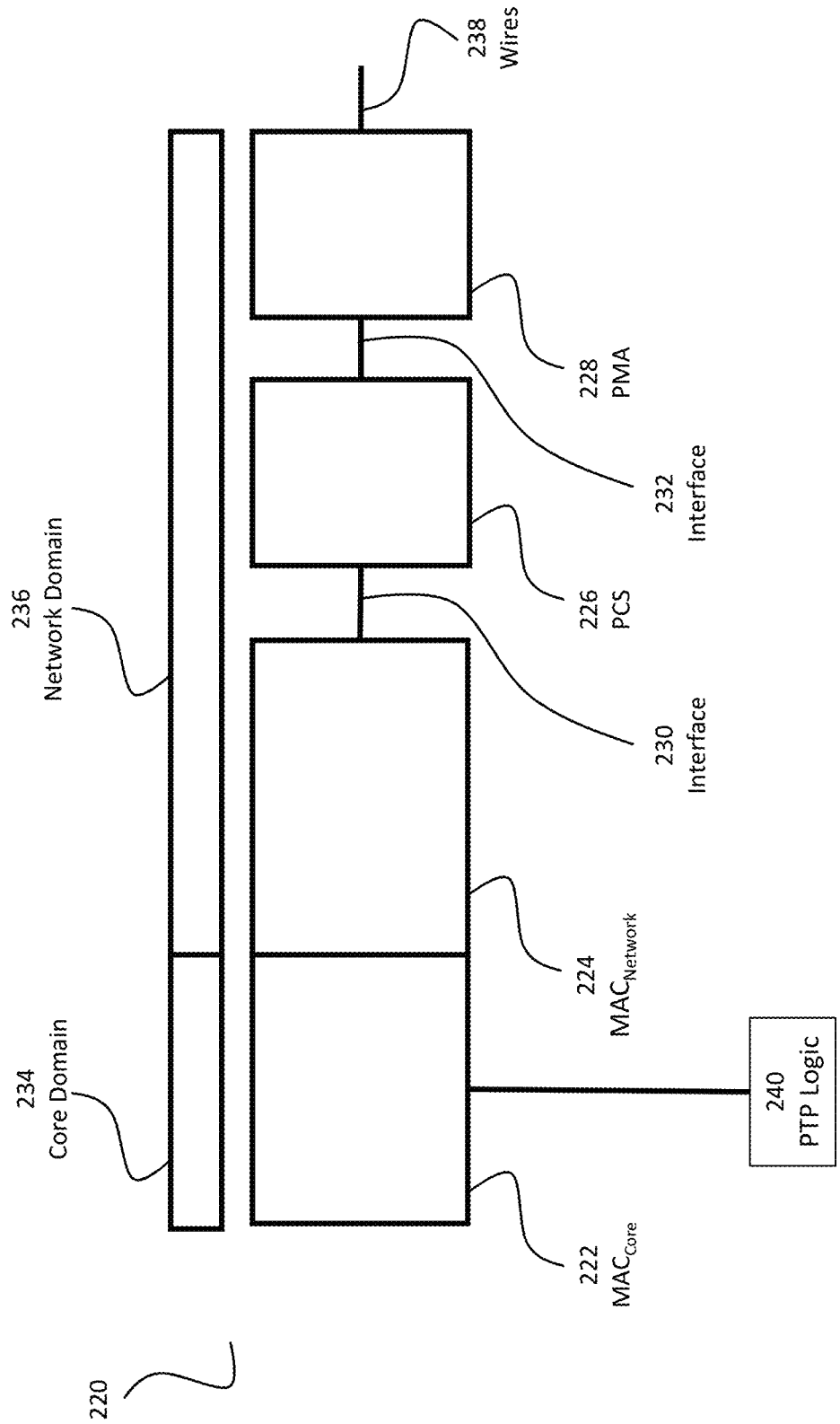
FIG. 2 shows schematically a previously presented implementation of timestamping.

A network interface device, such as the device shown schematically in FIG. 1, may implement time stamping, as shown in FIG. 2. Previously presented implementations of timestamp generation may implement a local oscillator (LCO) which may provide a local clock to establish a core clock domain, wherein the signal provided by the local oscillator may be used as a timing signal for the operation of logic located in the core domain. As mentioned previously, the MAC may be operated partially on the core domain, $MAC_{core}$, and partially operated on the network domain, $MAC_{network}$.

When receiving a network packet, the $MAC_{core}$ generates a timestamp signal to the PTP block, which represents the moment at which a given frame is received. The PTP block uses this signal to latch the value of a free running counter into a register.

The value(s) which are stored in the PTP may be used to provide a single timing value. Alternatively or conditionally, the captured value and the compensation values (phase and fractional offset) may be used to define a timing value. It should be appreciated that the compensation values may be defined on a per frame or packet basis.

When transmitting a network packet, the MAC generates a timestamp signal to the PTP block, which represents the moment at which a given frame is transmitted. The PTP block uses this signal to latch the value of a free running counter into a register The network communication may be understood to represent a network data stream comprising network data packets. Each network data packet may comprise a start of frame packet segment, wherein the start of frame packet occurs at the beginning of each network data packet, as discussed previously. Previously presented implementations, as shown in FIG. 2, may generate a time stamp signal within the core clock domain, from the MAC to the PTP Logic 240.

With reference to FIG. 2, implementations of timestamping such as 220 typically sample the start of frame within the $MAC_{core}$ 222, which is the MAC portion operating on the core clock domain 234. Using the aforementioned example, wherein the core clock domain 234 is operating at 800 MHz, timestamps may be taken which are already limited by the design to 3.2 ns resolution. Furthermore timestamps may be limited by the loss of precision caused by traversing between the $MAC_{Network}$ 224 on the network clock domain 236 and the $MAC_{core}$ 222 on the core domain 234. The time stamp may be communicated between the $MAC_{Network}$ and the PCS using an interface 230 operating at either 312.5 MHz using 32 bits or 156.25 MHz using 64 bits. The PCS component 226 may be linked to the PMA component 228 via an interface 232 operating at 322 MHz using 32 bits. Operating at a frequency f of 322 MHz results in a period T of 3.1 ns using the well-known relationship T=1/f. The PMA component 228 may have a SERDES implementation. The PMA 228 may be configured to provide a point of physical attachment for receiving one or more wires 238. The one or more wires may provide a connection between the network interface device and the network. It may be understood that the network interface device connects to a wider network via the one or more wires 238. The connection to the network may be provided at, for example, a frequency of 10.312 GHz. Alternatively and more specifically, the connection to the network may be provided at, for example, 1 bit/10.312 GHz.

The resolution and precision offered by current network interface devices may be limited. Better resolution and precision may be desirable in some applications.

In some embodiments, a-priori knowledge of the parameters of the shifting process at the PCS may be utilised to enable the start of frame transmission time to be predicted and thus the 190 ps resolution offered prior to the shifting process may be retained. This method may provide more than an order of magnitude improvement in performance, in some embodiments.

The parameters of the shifting process may include, for example, the phase difference between clock signals in the core domain and the transmit and receive network domains. The core domain signals may be in phase with a local oscillator. The receive network domain signals may be in phase with a remote master oscillator. The transmit network domain signals may be in phase with a local oscillator. The core domain and transmit domain signals may be generated by either the same or different oscillators.

Some embodiments may determine a relationship between the PCS clock and the clock which drives the timestamp counter logic to track, monitor, and/or measure the shifting process. The clock which drives the timestamp counter logic may be the PTP clock or the core clock.

In some embodiments, it may be desirable to not treat the PCS clock as indivisible until the signal is within the PMA. The PMA clock is often higher frequency than the PCS clock. As such, the PCS clock can be expressed as a fraction of the PMA clock, referred to as a fractional clock. The PCS/PMA clock is fractional because one clock is derived from the other through an arithmetic operation (e.g. divide by n (n may be, for example, 2)) and so the clock edges have a constant phase relationship.

In some embodiments, the fractional clock may be tracked when passing through the PCS regardless of whether the PCS has a lower clock than the components either side. It may be understood that the clock tracked through the PCS may be the actual clock, or the fractional clock, or a value which represents a number of fractional clock edges. The components surrounding the PCS may perform logical functions. The components either side of the PCS may each operate at a different clock rate than the PCS, wherein both clock rates may be higher than that of the PCS. The PCS is described by way of example, the techniques described herein may be applied to any logical component.

Tracking the clock information through the PCS is desirable, as this may reduce losses in timing resolution and precision of the signals. The loss in resolution and timing of a typical system that does not track the clock information through the PCS may be in excess of 10 times, and sometimes in excess of 16 times. A loss in timing information can be detrimental to time sensitive systems.

In some embodiments, more specifically regarding a receive operation, tracking the clock may comprise retaining the bit location of each data bit entering into the PCS from the PMA interface. It may be understood that the bit location refers to the relative location of each bit with respect to other bits in the data stream. A data bit entering into the PCS may be determined by the state of the bus line when a clock edge is detected, such as the leading or falling edge of the clock. The clock frequency of the PCS may be predetermined, or known based on the operational mode of the PCS. The clock frequency of the PMA may be predetermined, or known based on the operational mode of the PMA. The PCS clock may be divided by the PMA clock to provide the fractional clock information. The fractional clock information may be provided for each bit as it is processed. Each bit may be block aligned and line decoded at the PCS. Block alignment may be required because of the bit width change between functional units, for example, between the PCS and PMA or between the PCS and the MAC. By way of example, the PCS line encoding may operate using 66 bit blocks, such as discussed previously. These 66 bit blocks may be transferred to or from the PMA across the PMA/PCS interface. The PMA/PCS interface width may be 32 bits. The 32 bits words from the PMA/PCS interface, may require alignment to the 66 bit blocks of the PCS line encoding. This alignment process may be known as block alignment. In some embodiments, the PMA interface width may match the PCS line encoding block, and as such block alignment may not be necessary. Line decoding comprises converting the signal from the line coding of the network into the format required for the network interface device. The line encoding/decoding of the network may be defined by the IEEE802.3 standards. The block alignment and line decoding process reveals the Ethernet start of frame delimiter in the PCS logic. The interface between the PCS and the MAC may use the XGMII or similar protocols, which may be aligned using 32 or 64 bits. The start of frame delimiter may appear as a "block start" control block as per the XGMII protocol. Alternatively, the start of frame delimiter may appear as a "block start" control block of the protocol operating between the PCS and MAC.

It may be understood that a timestamp signal which is relative to the clock within the $MAC_{core}$ may be used. It may be understood that the timestamp signal may be a strobe. It may be advantageous to generate a timestamp comprising a value representing the fractional PMA clock using the PCS clock, which may require more than one bit. The number of bits used to store the timestamp may be one of 2 bits, 2 or more bits, 4 or more bits, 8 or more bits, or any other desired number of bits.

In some embodiments, more specifically regarding a transmit operation, tracking the clock may comprise retaining the bit location of each data bit entering into the PCS from the MAC interface. The bit location is retained by noting the bit position through the block align structure as a frame is sent to the PMA allowing the transmit timestamp to be reported.

A timestamp signal generated relative to the $MAC_{core}$ may be augmented with a value representing the number of PMA clock edges, or fractional PCS clocks, required to compensate for the block alignment operation which will be performed. At the point wherein the first word of a new frame is transmitted by the MAC it may be that the number of bits of shifting required is known. It may be understood that the operation does not have be completed before execution. Predictions may compensate for what is about to happen.

Each bit may be block aligned and line encoded at the PCS. Block alignment comprises aligning the payload to be sent with that of network packets within which they are to be sent. It may be understood that PMA input and output width may be matched to the block width such that no PCS block align function is required. Removal of the block align function may reduce latency. Line encoding comprises converting the signal from the line coding used in the network interface device in to the format require by the network. It may be understood that the bit location refers to the relative location of each bit with respect to other bits in the data stream. The bit location also acts as a counter, representing the fractional offset of start of frame within the PCS clock. A data bit entering into the PCS may be determined by the state of the bus line when a clock edge is detected, such as the leading or falling edge of the clock. The clock frequency of the PCS may be predetermined, or known based on the operational mode of the PCS.

The clock frequency of the MAC may be predetermined, or known based on the operational mode of the MAC. The $MAC_{core}/MAC_{network}$ clocks may be asynchronous. They have a moving phase relationship since they are derived from different oscillators. A phase detector is used to calculate the phase difference between edges of the two clocks at any given time.

In some embodiments, timestamps may be used by the core clock domain logic which compensates for the clock domain crossing from the network clock domain to the core clock domain. A network domain may provide the master clock. A local oscillator may provide a local or core clock. The local oscillator may be free running local oscillator.

The transmit side of the network domain may be derived from and be a fractional clock of the core clock. In that case, there would be a constant phase relationship between the clocks. As mentioned previously the clock may alternatively be from a different local oscillator.

The receive side is generally a domain crossing unless the core logic is driven by the derived network clock (as it would be for synchronous Ethernet).

By way of example, the PCS may be clocked at 322 MHz. In some embodiments, timestamp valves may be generated relative to the PCS clock. The timestamp values may be recorded within a dedicated precision time protocol (PTP) function with a logic subsystem operating at a different clock. For example, the logic subsystem may be clocked at 200 MHz. It may be understood that the logic subsystem may be clocked at any clock derived from an oscillator. The clock derived from an oscillator may be at the frequency of the oscillator, or a fractional frequency of the oscillator, or a multiple of the oscillator frequency. The logic subsystem may, for example, use a clock in the range of 200 to 800 MHz. The precision time protocol may, for example, be implemented in accordance with the IEEE 1588 standard.

The PMA may comprise a phase locked loop to synchronise communications with the network. The PMA and the wider network may operate at the same clock speed. As such, the PMA may operate with the same phase and clock rate as the network.

To maintain high timing resolution, losing information such as phase relationships at the domain crossing (between the network domain and the core domain) should be avoided. The information loss at the domain crossing may be mitigated using the phase relationship between the clock domains.

The timestamping interface may be the interface between the PCS and the PMA.

The transmit and receive paths are generally independent. As such each path may have its own PTP block.

Figure 3:
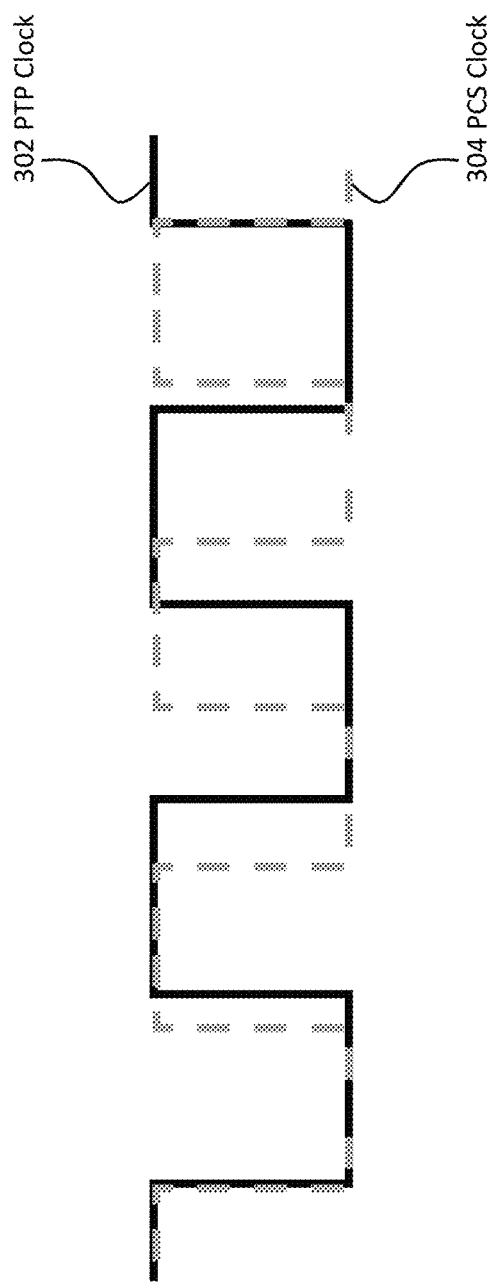
FIG. 3 shows the PTP clock in relation to the PCS clock.

By way of example, as shown in FIG. 3, the PTP clock 302 may operate at 200 MHz with each rising edge aligned perfectly to absolute time as the master clock. The PTP clock may be derived from a local oscillator. The PTP clock may be the same clock as that which provides the core domain clock. When considered in relation to the PCS clock 304 running at 322 MHz the PTP clock edges may be considered as continuously running backward.

Figure 4A:
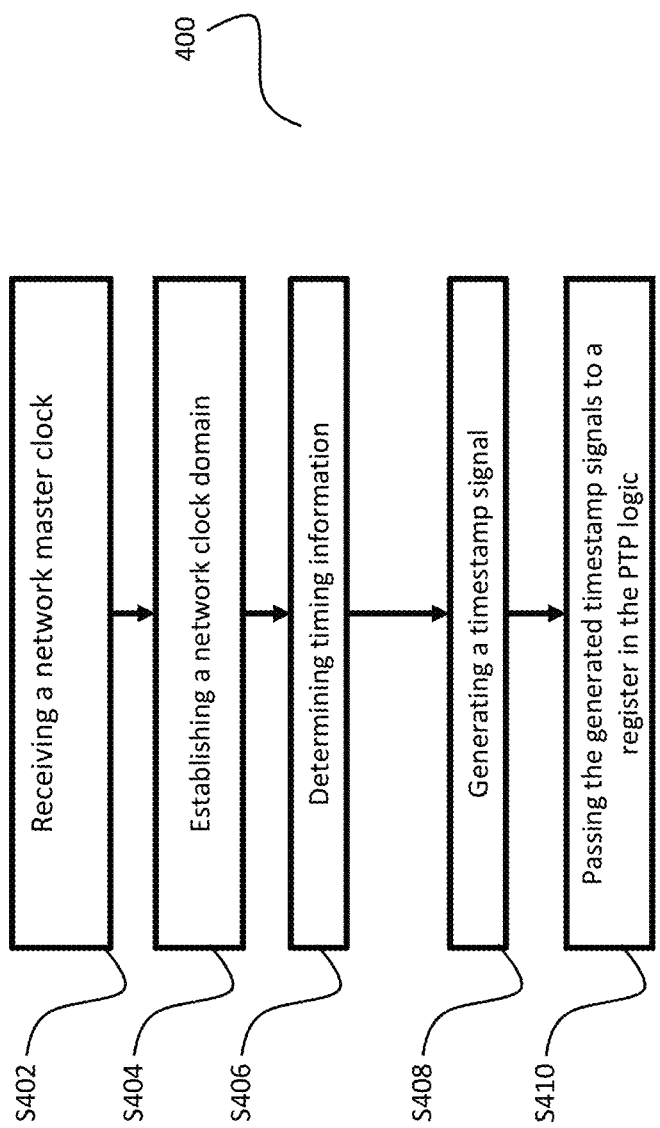
FIG. 4a shows a flowchart 400 of an embodiment wherein a timestamp is generated at the PCS of a network interface device during a receive operation.

FIG. 4a shows a flowchart 400 of an embodiment wherein a timestamp is generated in a network interface device during a receive operation. The timestamp generation method may comprise receiving the network master clock S402. The network master clock may be configured to provide a clock signal.

A network clock domain S404 may be established where the signal provided by the network master clock may be used as a timing signal for the operation of logic located in the network domain of the network interface device.

Step S406 may comprise determining timing information, such as one or more of a fractional clock and a fractional clock offset. The fractional clock may be the PMA clock expressed as a fraction of the PCS clock. The fractional clock offset may be determined by tracking the bit positions of data word as it traverses a gearbox structure. As discussed previously, the sync header indicates the start of a 66 bit block. The timestamp signal would usually be triggered from the first bit following the sync header, or any offset thereafter. The value of a fractional clock offset relative to a clock edge may be communicated to, or from the PCS using a double flip-flop synchroniser.

Step S408 may comprise generating a timestamp signal having a fractional clock offset and/or a clock phase relationship. The clock phase estimate represents the difference in the phase of respective clock edges between the MAC network and the MAC core. The clock phase estimate may be refined using phase locked loop type techniques. The phase locked loop may be located in the network clock domain. It may be understood that the network clock domain may refer to one or more of the master network clock domain and the slave network clock domain. The fractional clock offset of the timestamp signal may be generated at PCS. The PCS may generate a timestamp value based upon the value representing the number of fractional clock edges relative to the network clock within the PCS. The generation of a timestamp value may be performed upon the start of frame of a network communication being detected as discussed previously.

Step S410 may comprise passing the generated timestamp signals with the fractional clock offset information and the phase information to a register in the PTP logic which also causes a respective count value from a counter in the PTP logic to be latched into the register. The timestamp value may be passed to a register by the double flip-flop synchroniser The network communication may be understood to represent a network data stream comprising network data packets. Each network data packet may be as described previously.

Figure 4B:
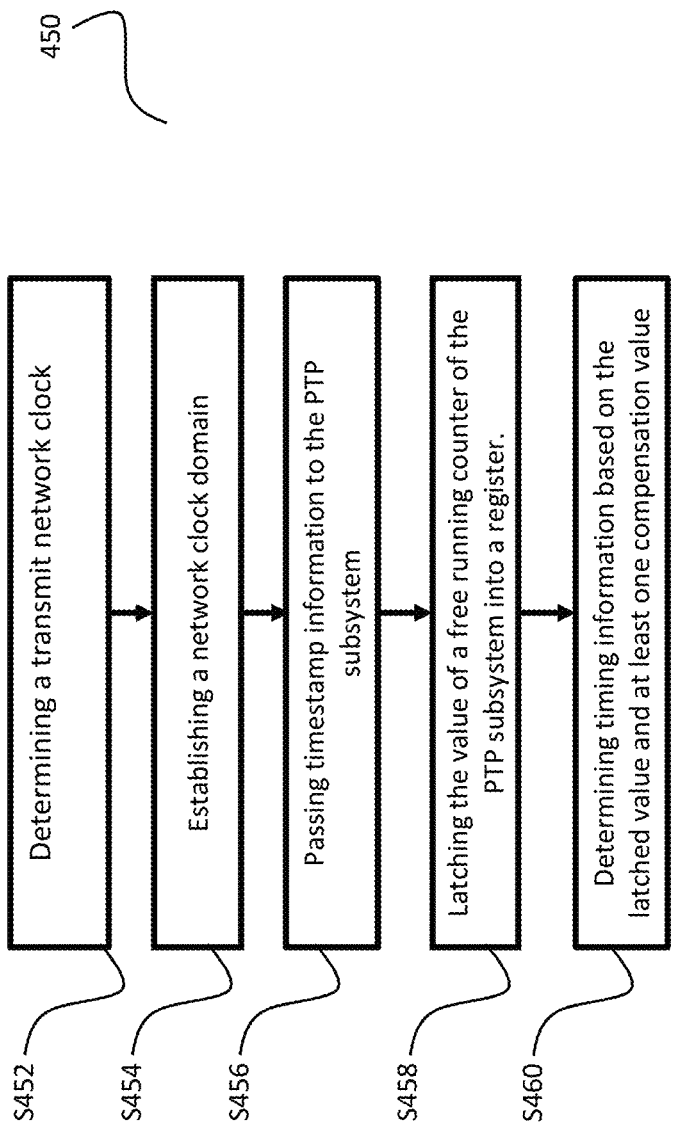
FIG. 4b shows a flowchart 450 of an embodiment wherein a timestamp is generated at the PCS of a network interface device during a transmit operation.

FIG. 4b shows a flowchart 450 of an embodiment wherein a timestamp is generated at the PCS of a network interface device during a transmit operation.

Step S452 may comprise determining a transmit network clock. The transmit network clock may be derived from a local oscillator. The core clock domain and the transmit network clock domain may be derived from the same local or different oscillator. Deriving the core clock domain and the transmit network clock domain from the same local oscillator may provide a fixed stable phase relationship between the core clock domain and the transmit network clock domain.

Step S454 may comprise establishing the transmit network clock. Establishing the transmit network clock may comprise operating at least part of the network clock domain logic on the determined transmit network clock Step S456 may comprise passing timestamp information to the PTP subsystem. Thus, the MAC generates a timestamp signal to the PTP block which a time at which a given frame is transmitted. Additionally or alternatively the MAC can be provided with a time expressed in bits (on the network wire) with which to wait before commencing transmission of a packet. In some embodiments, as well as the signal, the MAC presents one or two compensation values (phase and fractional offset) also to the PTP.

Step S458 may comprise the PTP block using the timestamp signal generated by the MAC to latch the value of a free running counter into a register.

Step S460 may comprise determining timing information based on at least the latched value. In some embodiments, timing information may be determined using the latched value and at least one compensation value, for example the fractional offset.

Figure 4C:
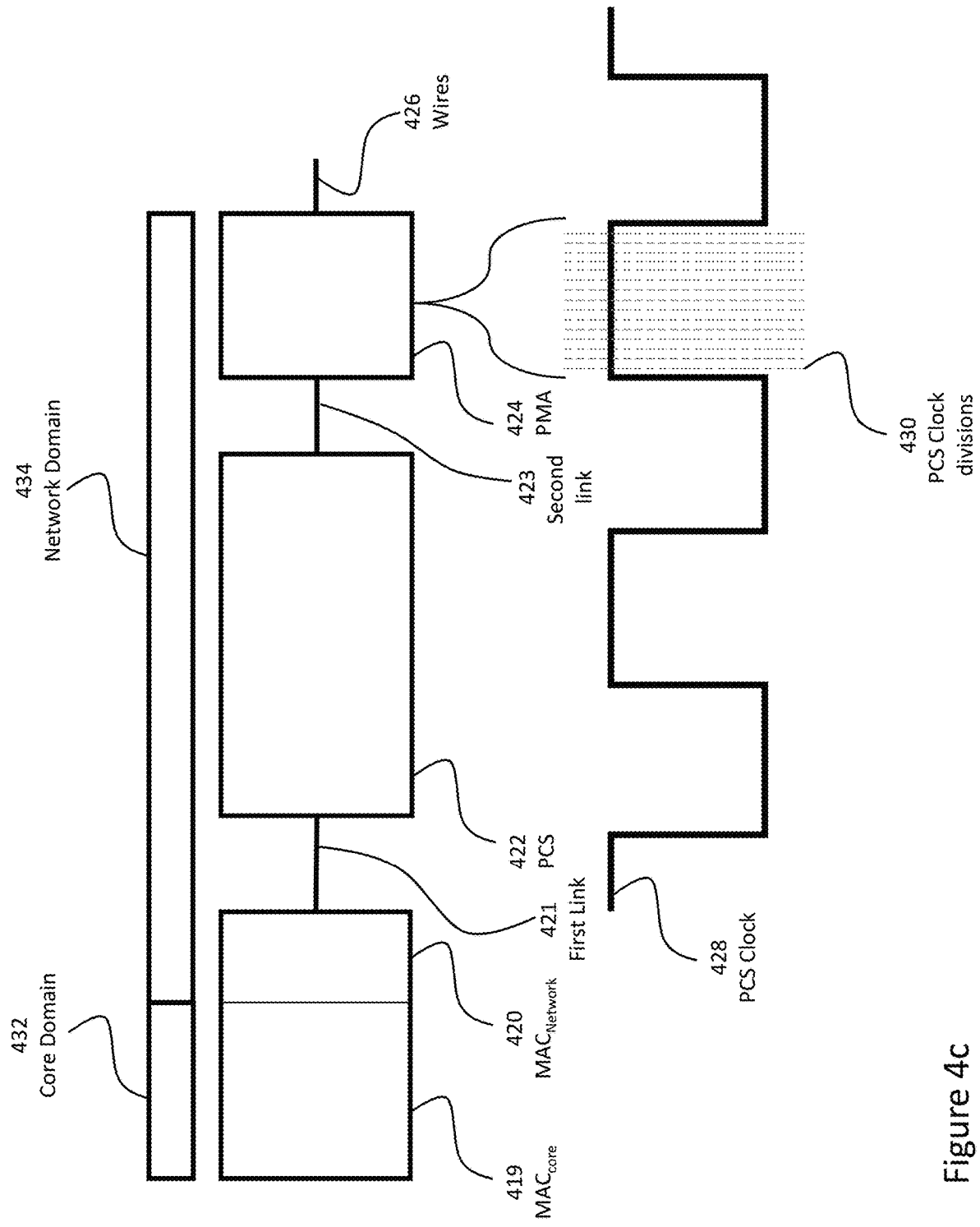
FIG. 4c shows a schematic of an embodiment.

FIG. 4c shows a schematic view of an embodiment. The MAC 419, 420 may operate partially in the core domain 432 and partially in a network domain 434. That is to say, the MAC may comprise the $MAC_{core}$ 419 and the $MAC_{network}$ 420. A local oscillator may provide a local clock, which establishes the core clock domain 432, wherein the signal provided by the local oscillator may be used as a timing signal for the operation of logic located in the core domain. The MAC component 420 may be connected to the PCS component 422 via a first link 421. The first link 421 may, for example, operate at either 312.5 MHz using 32 bits or 156.25 MHz using 64 bits. However, it may be understood that the first link may operate at any frequency or speed, with any number of bits. The PCS 422 may operate in the network domain 434. The network domain 434 may be a slave network domain, wherein a master network domain may provide a master clock. The master network domain may provide the master clock to the PMA 424. The master clock may be provided via one or more wires 426.

The PCS component 422 may be linked to the PMA component 424 via a second link 423. The second link may operate at, for example, 322 MHz using 32 bits. The timestamp value may be determined by the PMA 424 at the best resolution available from the SERDES implementation. For example, if the start of frame is encoded using 2 bits there may be 16 values 430 (for a 32 bit interface between the PCS/PMA). The 16 values divide the PCS clock 428 and provide 16 possible offsets to be applied to any given time stamp. The PMA 424 may know the PCS clock, or is able to derive it from the fractional clock. By way of example, the period of the fractional clock may be 3.1 ns. As such, the resolution of the timestamp becomes 3.1 ns/16.

The PMA 424 may be configured to provide a point of physical attachment for receiving one or more wires 426. The one or more wires may provide a connection to a network. The connection to the network may be provided at a frequency of 10.312 GHz, in some embodiments, this may be 1 bit/10.312 GHz.

Figure 5:
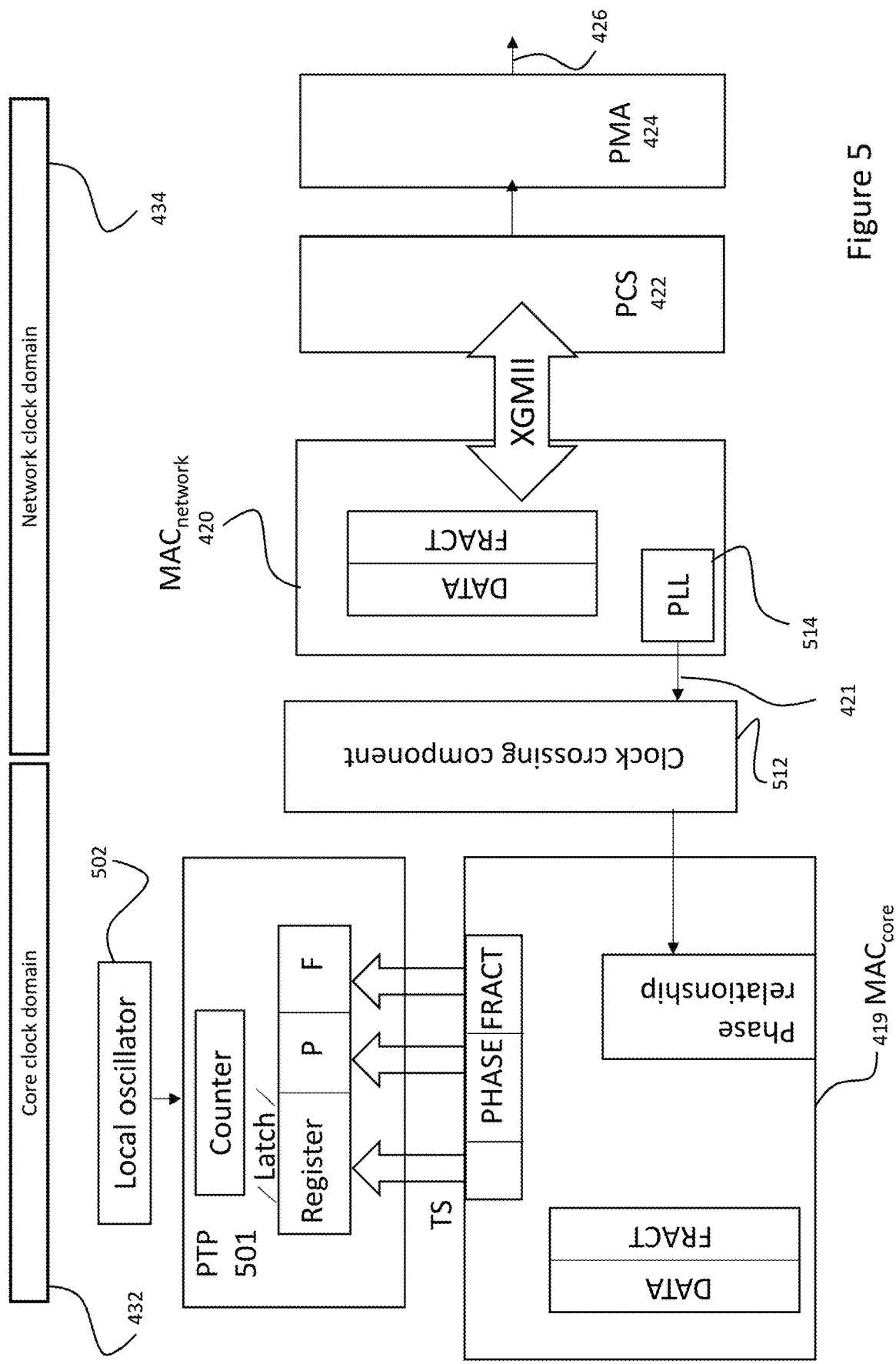
FIG. 5 shows a schematic of an embodiment.

Reference is made to FIG. 5 which shows the embodiment of FIG. 4c in more detail. Different circuitry may be provided for the receive path and for the transmit path. The PCS 422 may be connected to the $MAC_{network}$ component 420. The MAC network component may comprise a PLL 514. It may be understood that a PLL is provided by way of example, the PLL may be any type of phase detection component. The PLL may be used to provide a phase detection function. This may be for the receive case. This phase detection may not be required in the transmit case. The MAC PLL 514 may be a digital PLL. The PCS 422 may operate in the network clock domain 434. The PCS 422 may be communicably coupled to the $MAC_{network}$ 420 via a link. The link between the PCS 422 and $MAC_{network}$ 420 may use the XGMII standard. The PCS 422 may be considered to be the slave clock domain, wherein a remote network clock forms the master domain, in the receive case. The MAC PLL 514 may be configured to compute the phase difference between the network clock 434 and PTP clock. The PTP clock may be determined from a local oscillator 502. The local oscillator may be, for example, a temperature compensated crystal oscillator (TCXO). The PTP clock may be the same clock as that which provides the core domain clock. The core domain 432 may form a local domain 432. The local oscillator 502 of the core domain may not match the phase of the network clock, particularly in the receive case. However, it may be desirable to know the difference in phase between the network domain 434 and the core domain 432.

The PCS 422 may determine timestamp information (fractional offset) based on a network signal. The network signal may be communicated over one or more wires 426 by the PMA 424. The PMA 424 may be configured to provide a point of physical attachment for receiving one or more wires 426, in the receive case. The one or more wires may provide a connection to a network in the transmit case. The connection to the network may be provided at a frequency of 10.312 GHz, or more specifically 1 bit/10.312 GHz.

The PCS 422 may generate timestamp information (fractional offset) based on the arrival time of an incoming network packet. The PCS 422 may generate timestamp information based on the arrival time of a specific bit. For example, the PCS 422 may be configured to provide timestamp information upon receipt of one or more of the first bit of a network packet, the last bit of a network packet, and any other bit of the network packet. The network packet may form part of a network stream comprising a plurality of network packets. Timestamp information may be generated for each network packet. Timestamp information may be generated for each network stream. The PCS 422 may generate a fractional offset as described previously. The fractional offset FRACT may be communicated with the data DATA of the network packet, in the receive case. The data DATA may comprise a 64 bit block.

The MAC PLL 514 may be configured to determine the phase of the network domain 434 with respect to a virtual clock. The MAC PLL 514 may communicate the timestamp information with the $MAC_{network}$ 420. The $MAC_{network}$ 420 may communicate the timestamp information with the $MAC_{core}$ 419. It may be understood that the $MAC_{network}$ may be in a different clock domain to that of the $MAC_{core}$. The interface 510 is between the network domain 434 and the core domain 432. The $MAC_{core}$ 419 may operate on the clock signal provided by the local oscillator 502. The clock signal may be provided by the local oscillator 502 to the $MAC_{core}$ 419. The network domain may be the master domain. The $MAC_{core}$ 419 may communicate the timestamp information with a PTP 501. The PTP 501 may determine an accurate timestamp based on at least one of the timestamp information and a counter. By tracking timing information such as, for example, the phase difference through the transition from the network domain 434 to the core domain 432, timing resolution may be maintained. The MAC PLL may be configured to determine a clock phase difference estimate.

The clock phase estimate may be communicated across the $MAC_{core}$ and $MAC_{network}$ interface using a clock crossing component 512, such as a double flip-flop synchronizer. A double flip-flop synchronizer 512 is used by way of example, however, it may be understood that other asynchronous domain crossing logic may be used to communicate the clock phase estimate across the interface between the $MAC_{network}$ and $MAC_{core}$. The interface between the $MAC_{network}$ and $MAC_{core}$ may comprise a first link 421. The clock phase estimate may be communicated across the interface between the $MAC_{network}$ and $MAC_{core}$ 510 using the first link 421. The determination of the clock phase estimate may be based on one or more of: a predetermined approximation of the master clock's period; a measured value; and the operational mode of the PLL.

In some embodiments, a two stage approach may be used to enhance the rate of convergence of the running estimate of the phase difference between the first clock and second clock. The two stage approach may enable a coarse estimation of the clock phase estimate and a fine estimation of the clock phase difference. Refining the estimate may further enhance the timing resolution.

In an embodiment the clock phase estimate is estimated as a 16 bit quantity, resulting in 65536 values representing a phase of up to 360° and a period 5 ns. In this example, each bit represents 76 fs of timing resolution. It may be understood that any number of bits may be used to estimate or represent the clock phase estimate, for example, one of 2 bits, 4 bits, 8 bits, 16 bits, 32 bits, more than 16 bits, or more than 32 bits may be used. In some embodiments the number of bits used to estimate the clock phase estimate may be the same as the number of bits used to represent the clock phase estimate. In some embodiments the number of bits used to estimate the clock phase estimate may differ from the number of bits used to represent the clock phase estimate In an embodiment, the PTP time is transferred by representing time as a 96 bit entity. It may be understood that 96 bits may be selected in accordance with a PTP specification, time may be represented as any number of bits in other embodiments. This entity is associated with each frame transmission or reception operation as meta-data to the data-path logic. This may be used, for example to report as part of an event to host software the fact that a particular packet was transmitted or received at a particular time. Transferring the PTP time may comprise providing a strobe with a frequency corresponding to every 4 clocks 534. The strobe may be passed to the clock domain crossing component 512. The clock domain crossing component 512 may be, for example, one of a double flip-flop synchroniser, an asynchronous first in first out buffer, and any other component configured to provide a clock domain crossing. It may be understood that the strobe may be provided corresponding with any number of clocks. The number of clocks to which the strobe corresponds may be an integer multiple of clocks. The number of clocks to which the strobe corresponds may correspond to one of the fractional clock, and the reciprocal of the fractional clock. That is to say, the number of clocks to which the strobe corresponds may be determined based upon the ratio between one of: a network clock and PCS clock; or the core domain clock and PCS clock.

This strobe may be passed from a first clock domain to a second clock domain using a double flip-flop synchronizer 512, as shown in FIG. 5. The double flip-flop synchronizer may be configured to provide an output 508 based on two input clocks 532, 534. For example, the double flip-flop synchronizer may provide an output when a clock edge is detected, such as the leading or falling edge of the clock.

Figure 6:
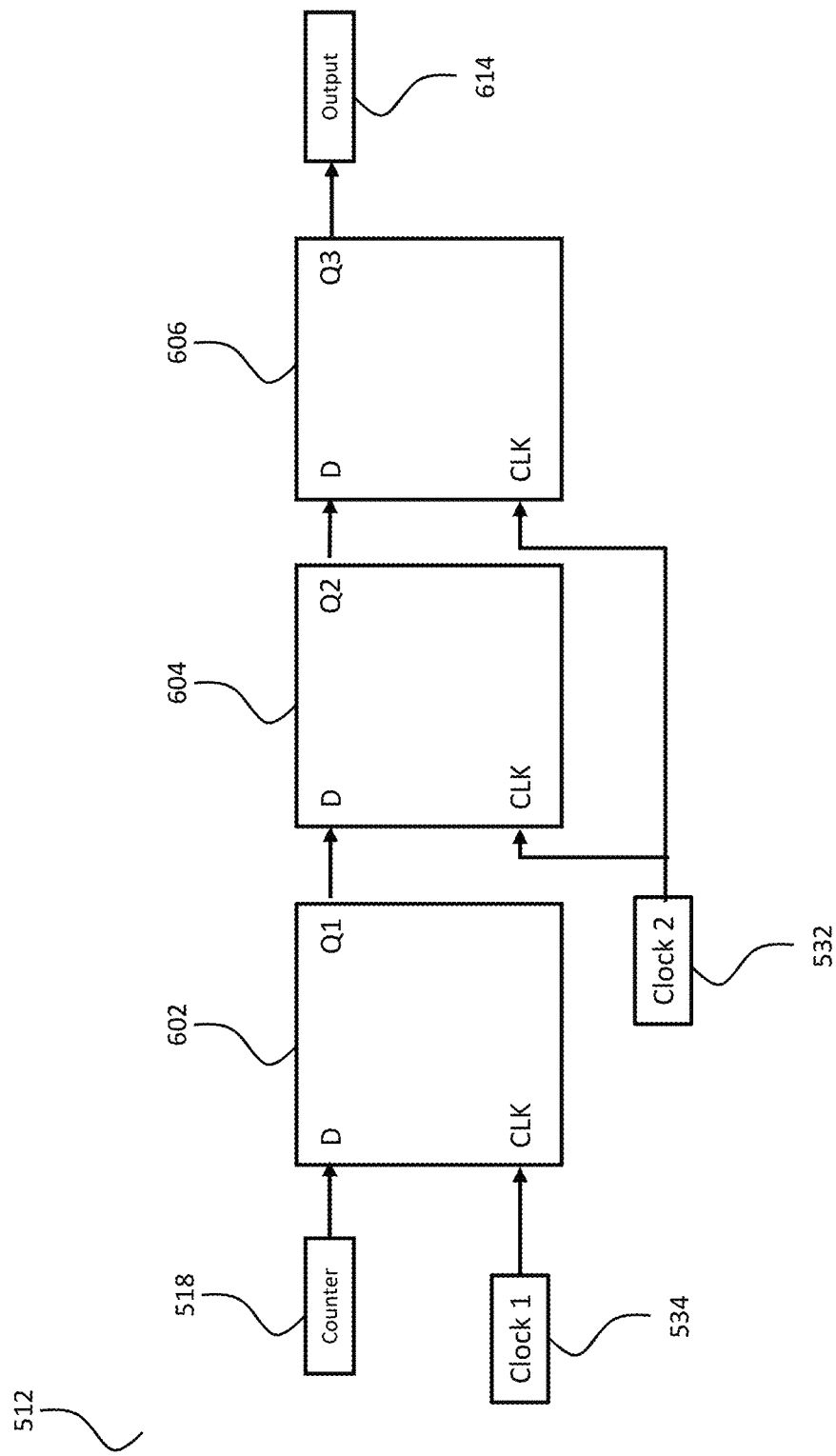
FIG. 6 a schematic example of a double flip-flop synchronizer.

An example of such a double flip-flop synchronizer 512 is shown in FIG. 6. A double flip-flop synchronizer may be constructed comprising three D-type flip-flops 602, 604 and 606, as shown in FIG. 6. Each of the flip-flops may comprise an input D, an output Q and a clock input CLK. The double flip-flop synchronizer may transfer the time stamp counter value from one clock domain to another.

The counter 518 may provide a signal to the double flip-flop synchronizer 512. It may be understood that the double flip-flop synchronizer is used by way of example only. The synchronizer may have a synchronizer chain as wide as the number of bits in the counter width. That is to say if the counter counts using 3 bits, the synchronizer chain may be 3 bits wide. The signal from the counter 518 may be provided at the same phase and frequency as the first clock 534. The double flip-flop synchronizer may be configured to allow a meta-stable output to settle to a stable value in the destination clock domain. The first flip-flop 602 with output Q1 may sample the signal from the counter 518 at the first clock, clock 1 534. Output Q1 provides the counter signal sampled at the first clock rate, clock 1 534. The second flip-flop 604 with output Q2 samples the output of Q1 into the destination clock domain, clock 2 532. If the second flip-flop samples Q1 at an undesirable time, for example, during a signal transition, a meta-stable state may arise in which the signal provided at Q2 is neither a logical 1 nor a logical 0. The third flip-flop 606 with output Q3 may wait a full destination clock cycle, which may allow a meta-stable output at Q2 to decay. The third flip flow may then sample the now stable signal at Q2. Q3 provides a stable output which is synchronized to the destination clock, clock 2 532. In some embodiments, further flip-flops may be added to ensure stability of the synchronizer output.

The double flip-flop synchronizer may introduce a known delay. The delay may be determined using predetermined information such as, for example, the slave clock period. The known delay may be accounted for and corrected to match the master clock using phase information provided by the PCS PLL.

The timestamp value may be determined by the PCS at the best resolution available from the SERDES implementation at the PMA. For example, if the fractional clock is 3.1 and the start of frame is encoded as 2 bits in a 32 bit interface, the timing resolution may be 3.1 ns/16 values≈190 ps. These values may then be transferred between clock domains using the PCS PLL with empirical precision of ±1 ps. That is to say, the timing resolution may be accurate to 190±1 ps using these example values. The time stamp may be stored as metadata in the case of the receive data, used to control the transmission of data in the transmit case and/or used as metadata for the transmit event which reports the fact of a transmission back to the host.

The network interface device may further be configured to track drift and jitter of the network clock relative to the local oscillator. The drift and jitter can be used to track network performance anomalies. The local oscillator may be stable and precise. The local oscillator may be, for example, a temperature compensated crystal oscillator (TCXO) or an oven controlled crystal oscillator. In some embodiments, the local oscillator may operate at 20 MHz. It may be understood that the local oscillator may operate at any other suitable frequency.

In some embodiments, the values relating to synchronisation to the master clock such as drift, jitter, and clock phase estimate may be combined in the MAC to reconstruct the master clock.

In some embodiments, the values relating to synchronisation to the master clock such as drift, jitter, and clock phase estimate may be presented individually to a PTP subsystem as separate register values.

It may be understood that although this techniques is described with reference to a single lane MAC, the technique may also be applied to a multilane MAC. In a multilane embodiment, there may be one or more PCS PLLs, sampling each lane at a different time. Alternatively or additionally, there may be a PLL for each lane. Once the phase is determined for each lane, as described previously, a skew value is determined for each additional lane, wherein the skew value represents the skew between each SERDES lane. Thus, there is enough information to reconstruct or estimate each network lane in the core domain. In some embodiments, each PLL may act independently. In some embodiments, all PLLs may be logically in the same clock domain. The PCS on transmit may use the stream of 66*b* blocks and scatter them over the outgoing lanes. On receive, the PCS may reassemble the blocks into one logical stream to the MAC. On receive there may be one network clock, but there may be minor timing variations between each lane, these minor timing variations may be referred to as skew. The PCS may perform de-skewing functions. As such, in a multilane embodiment, there may only be one PLL between the network domain and the core domain. The per-packet compensation may take into account the time interval caused by inter-lane skew. The 66*b* block corresponding to the start of frame may appear or be sent on any PCS lanes.

Figure 7:
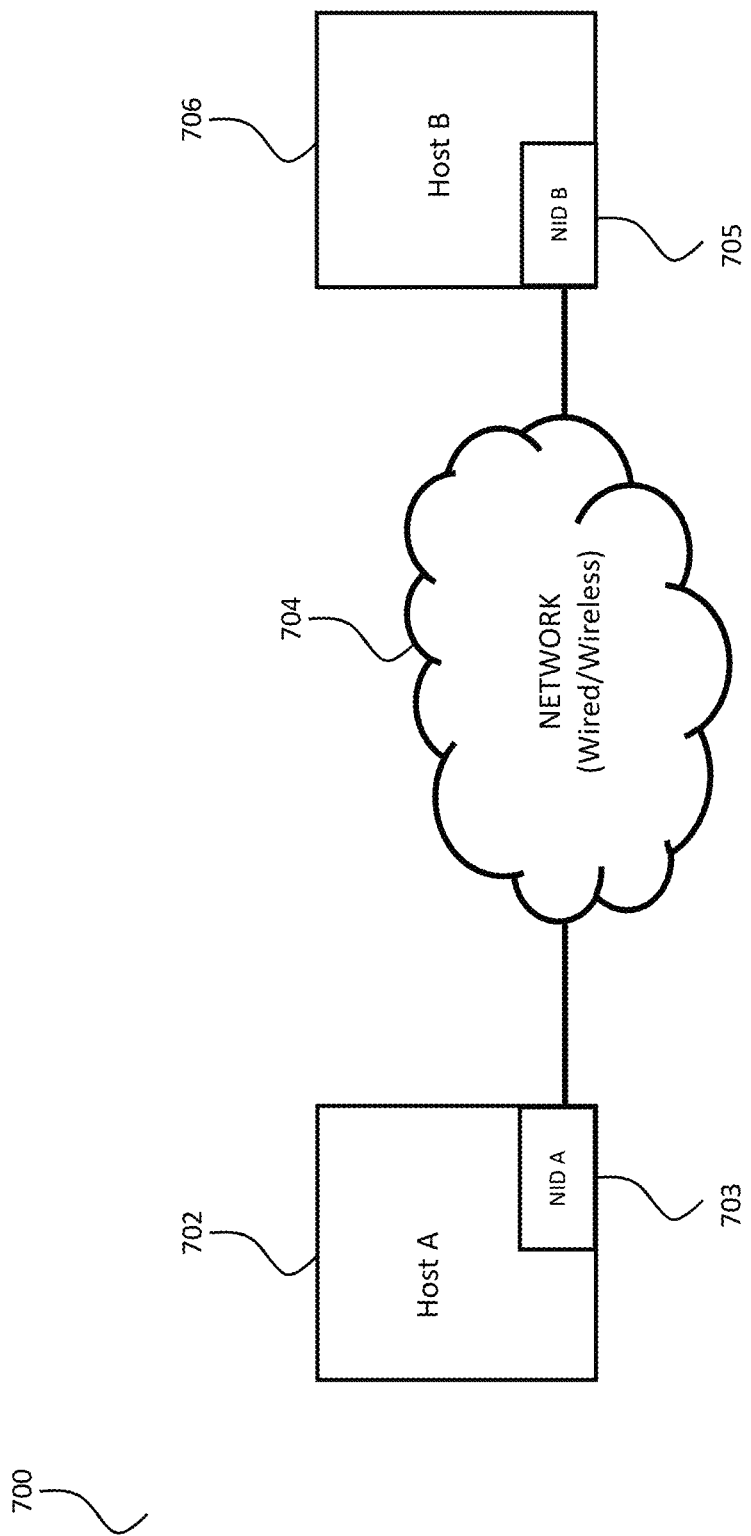
FIG. 7 shows an embodiment of hosts communicating via the claimed network interface device.

FIG. 7 shows an embodiment of hosts (devices) communicating via a respective network interface device. Host A 702 may communicate with another host, such as host B 706 via a network 704, each host having a respective network interface device (NID) 703, 705. It may be understood that the network may operate at any suitable frequency or speed. The network may be wired or wireless. It may be understood that each host 702 or 706 may have more than one network interface device 703, 705. That is to say, each host may have a plurality of network interface devices.

Figure 8:
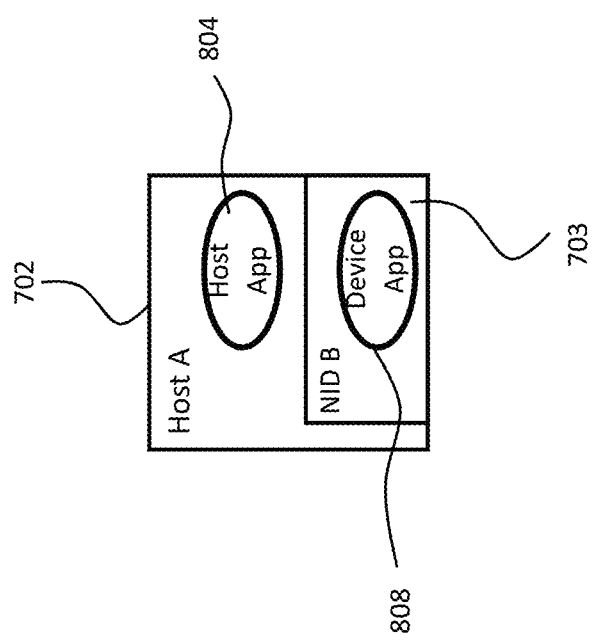
FIG. 8 shows an embodiment of a host comprising the claimed network interface device.

FIG. 8 shows an embodiment of the host A of FIG. 7 comprising a network interface device. It may be understood that the host comprises a network interface device 703. The host 702 may comprise a host application 804. The host application may be configured to determine or use an accurate time of packet reception or transmission. The network interface device 703 may comprise a device application 808. The device application 808 may be configured to determine an accurate timestamp using the methods described herein. The device application 808 may be communicably coupled to the host application. These applications may be separate or part of the same application. Timing information may be passed between the device application 808 and the host application 804. It may be understood that the host 702 may have more than one network interface device 703. That is to say, the host may have a plurality of network interface devices, wherein each network interface device comprises its own device application 808.

It may be understood that some embodiments may be embodied at a network switch.

It may be understood that some embodiments may be embodied at a server.

It may be understood that the techniques described herein may be applied to Ethernet standards beyond those described by way of example. It may also be understood that the technique is not limited to a single lane Ethernet standards. That is to say the techniques described herein may be applied to multi-lane Ethernet standards. As such, the techniques may be applied to, but are not limited to, 1 G, 10 G, 25 G, 40 G, 50 G or 100 G Ethernet links Preferably the PCS, PMA and MAC are embodied at one or more reconfigurable logic devices. Suitably the reconfigurable logic device may be an FPGA. Additionally or alternatively, one or more of the PCS, PMA and MAC may be embodied at an ASIC.

It should be understood, that the PCS is used by way of example, the methods described herein may be used to communicate information relating to one clock through a component with a lower clock without necessitating the actual synchronisation of the clocks either side of the component with the lower clock.

It should be understood that one or more links may be provided across an interface. As such, references to attributes of a "link" may correspond to references relating to a corresponding "interface" and vice versa.

The techniques described herein enable timestamp and timing information to be used within a statistically multiplexed network implementation. The techniques when used as described herein may result in an order of magnitude improvement in timing precision.

The embodiments may be implemented by computer software executable by a data processor, such as in a processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), as non-limiting examples.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A network interface device comprising:
an interface component configured to receive a data frame from a network whilst operating at an interface component clock frequency;
a physical layer processing component configured to receive said data frame from the interface component whilst operating at a physical layer processing component clock frequency, wherein the interface component clock frequency is different to the physical layer processing component clock frequency; and timing logic configured to store for said data frame a first timestamp value and information for timestamp compensation, wherein said information for timestamp compensation comprises a fractional clock value dependent upon the interface component clock frequency and the physical layer processing component clock frequency, said first timestamp value and said information for timestamp compensation representing a time when said data frame was received.

2. A network interface device as claimed in claim 1, wherein said physical layer processing component configured to provide first information for timestamp compensation.

3. A network interface device as claimed in claim 1, wherein said fractional clock value comprises an offset value associated with a given bit of said data frame.

4. A network interface device as claimed in claim 3, wherein said offset value is represents an offset between a clock edge of said interface component clock frequency and a respective clock edge of said physical layer processing component clock frequency.

5. A network interface device as claimed in claim 1, wherein said interface component comprises a physical medium attachment component.

6. A network interface device as claimed in claim 1, wherein said interface component clock frequency and the physical layer processing component clock frequency are such that one is derived from the other or derived from a common clock source.

7. A network interface device as claimed in claim 1 comprising a data processing component configured to cause at least one of said first timestamp value and said information for timestamp compensation to be stored in said timing logic.

8. A network interface device as claimed in claim 1, wherein said timing logic comprises a PTP component.

9. A network interface device as claimed in claim 7, wherein said data processing component is in a different clock domain to the physical layer processing component.

10. A network interface device as claimed in claim 9, comprising a phase detector configured to determine a difference in a phase between a respective clock edge used by said data processing component and a corresponding clock edge used in the clock domain of the physical layer processing component.

11. A network interface device as claimed in claim 10, wherein second information for timestamp compensation further comprises information on said difference in phase.

12. A network interface device as claimed in claim 1, wherein the timing logic is configured to provide said first timestamp value and said information for timestamp compensation or time stamp information derived therefrom to an application to use the information as a time that said data frame is received.

13. The network interface device of claim 1, wherein an interface bit width of the interface component is one of the same or different to that of the physical layer processing component.

14. A network interface device as claimed in claim 1, comprising a data processing component, wherein said data processing component is in a different clock domain to the physical layer processing component.

15. A network interface device as claimed in claim 14, comprising a phase detector configured to determine a difference in a phase between a respective clock edge used by said data processing component and a corresponding clock edge used in the clock domain of the physical layer processing component.

16. A network interface device as claimed in claim 15, wherein second information for timestamp compensation further comprises information on said difference in phase.

17. A network interface device as claimed in claim 1, wherein said information for timestamp compensation is generated specifically for said frame following receipt of said frame from the network.

18. A network interface device comprising:
a physical layer processing component configured to receive a data frame to be sent over a network whilst operating at a physical layer processing component clock frequency;
an interface component configured to receive said data frame from the physical layer processing component whilst operating at an interface component clock frequency, wherein the interface component clock frequency is different to the physical layer processing component clock frequency; and
timing logic configured to store for said data frame a first timestamp value and information for timestamp compensation,
wherein said information for timestamp compensation comprises a fractional clock value dependent upon the interface component clock frequency and the physical layer processing component clock frequency,
and wherein said information for timestamp compensation is specific to said frame, said first timestamp value and said information for timestamp compensation representing a time when said data frame was one of transmitted or scheduled to be transmitted.

19. A network interface device as claimed in claim 18, said physical layer processing component configured to provide first compensation information.

20. A network interface device as claimed in claim 18, wherein said fractional clock value comprises an offset value associated with a given bit of said data frame.

21. A method comprising:
receiving a data frame from a network whilst operating at an interface component clock frequency;
receiving said data frame at a physical layer processing component whilst the physical layer processing component operates at a physical layer processing component clock frequency, wherein the interface component clock frequency is different to the physical layer processing component clock frequency; and
storing for said data frame a first timestamp value and information for timestamp compensation,
wherein said information for timestamp compensation comprises a fractional clock value dependent upon the interface component clock frequency and the physical layer processing component clock frequency; and
wherein said first timestamp value and said information for timestamp compensation represent a time when said data frame was received.

22. A method comprising:
receiving a data frame for transmission on a network whilst operating at a physical layer processing component clock frequency;
receiving said data frame at an interface component whilst the interface component is operating at an interface component clock frequency, wherein the interface component clock frequency is different to the physical layer processing component clock frequency; and storing for said data frame a first timestamp value and information for timestamp compensation, wherein said information for timestamp compensation comprises a fractional clock value dependent upon the interface component clock frequency and the physical layer processing component clock frequency, and wherein said first timestamp value and said information for timestamp compensation represent a time when said data frame was one of transmitted or scheduled to be transmitted.

23. A network interface device comprising:

an interface component configured to receive a data frame from a network whilst operating at an interface component clock frequency;

a physical layer processing component configured to receive said data frame from the interface component whilst operating at a physical layer processing component clock frequency, wherein the interface component clock frequency is different to the physical layer processing component clock frequency; and at least one processor; and at least one memory coupled to the at least one processor, the at least one memory storing instructions which, when executed by the processor, perform functions of storing, for said data frame, a first timestamp value and information for timestamp compensation, wherein said information for timestamp compensation comprises a fractional clock value dependent upon the interface component clock frequency and the physical layer processing component clock frequency wherein said first timestamp value and said information for timestamp compensation represent a time when said data frame was received.

24. A network interface device comprising:

a physical layer processing component configured to receive a data frame to be transmitted over a network in a transmit operation whilst operating at a physical layer processing component clock frequency;

an interface component configured to receive said data frame from the physical layer processing component whilst operating at an interface component clock frequency, wherein the interface component clock frequency is different to the physical layer processing component clock frequency; and at least one memory coupled to at least one processor, the at least one memory storing instructions which, when executed by the processor, perform functions of storing for said data frame a first timestamp value and information for timestamp compensation, wherein said information for timestamp compensation comprises a fractional clock value dependent upon the interface component clock frequency and the physical layer processing component clock frequency, wherein said first timestamp value and said information for timestamp compensation represent a time when said data frame was one of transmitted or scheduled to be transmitted.

25. A network interface device as claimed in claim 24, wherein said information for timestamp compensation is generated specifically for said frame as part of the transmit operation for said frame.

* * * * *